March 12, 1940.  F. F. KISHLINE ET AL  2,193,533
FUEL SYSTEM FOR INTERNAL COMBUSTION ENGINES
Filed May 1, 1937  2 Sheets-Sheet 1
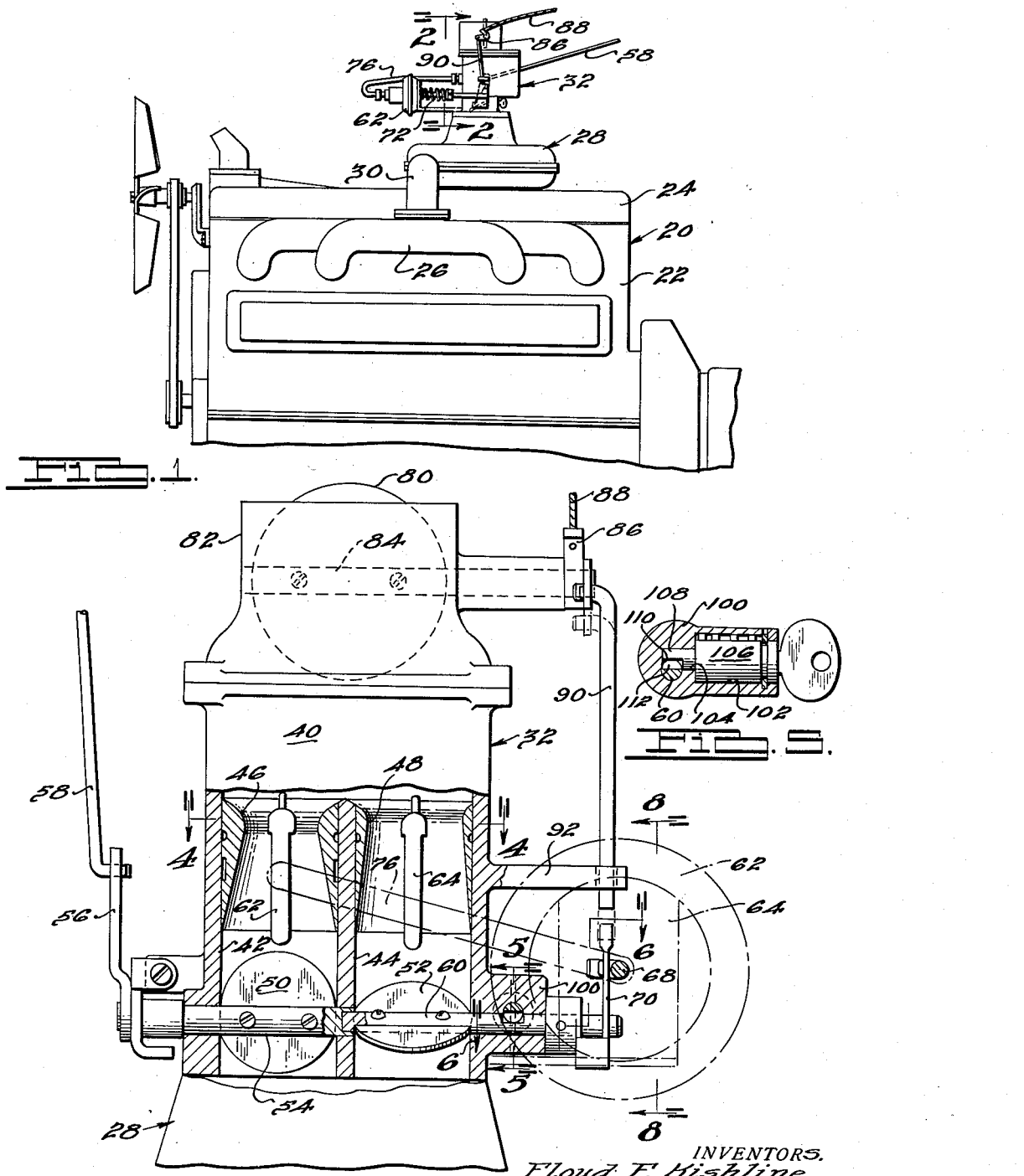
INVENTORS.
Floyd F. Kishline,
Harry G. Sanger.
BY Harness, Dickey & Pierce.
ATTORNEYS.

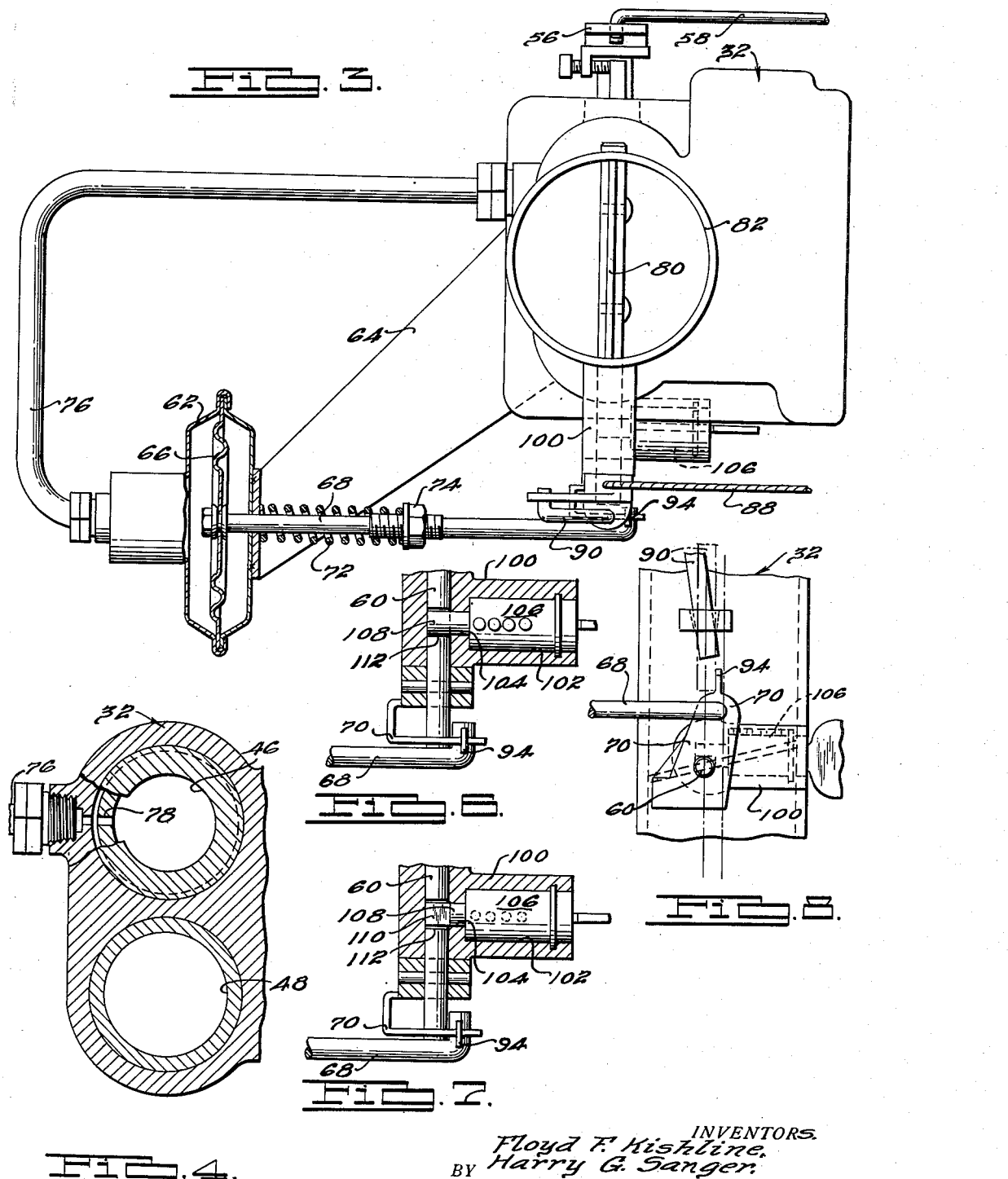

Patented Mar. 12, 1940

2,193,533

UNITED STATES PATENT OFFICE 2,193,533

FUEL SYSTEM FOR INTERNAL COMBUSTION ENGINES

Floyd F. Kishline, Birmingham, and Harry G. Sanger, Detroit, Mich., assignors to Graham-Paige Motors Corporation, Detroit, Mich., a corporation of Michigan Application May 1, 1937, Serial No. 140,082

3 Claims. (Cl. 261—23)

This invention relates to fuel systems for internal combustion engines and particularly to a construction by means of which satisfactory and economical operation of an engine may be obtained at relatively low speeds without restricting the maximum power output which the engine would otherwise be capable of developing at relatively high speeds.

Other objects of the invention include the provision of a fuel supply system for internal combustion engines by means of which a satisfactory intimacy of fuel mixture will be maintained at low engine speeds by maintaining a high velocity of the same in the fuel induction system without unnecessarily restricting the flow of the fuel mixture in the fuel induction system at high engine speeds; the provision of a carburetion system for internal combustion engines including means forming a fuel and air mixture chamber of relatively small area operable under normal low speed operating conditions to provide a relatively high velocity stream of combustible mixture for passage through the induction passages of the engine and which area will be automatically increased in accordance with the demands of the engine particularly at higher engine speeds whereby to provide the necessary unrestricted flow of combustible mixture through the induction passages necessary to obtain a maximum power output of the engine; the provision of a carburetion system for internal combustion engines including a multi-barreled or multi-venturi carburetor both barrels of which feed a common induction system, one of the barrels having a manually operable throttle valve therein and the other barrel or barrels having a throttle valve therein operable in accordance with the demands of the engine itself for additional volumes of combustible mixture; the provision of a fuel induction system for internal combustion engines including a pair of fuel mixture chambers connected to a common distribution system, a manually operable throttle valve in one of the chambers controlling the flow of combustible mixture therethrough, a throttle valve in the second chamber controlling the flow of combustible mixture therethrough, and means for controlling the second throttle valve in accordance with the pressures existing in the induction system on the upstream side of the first mentioned throttle valve.

Other objects of the invention are to provide, in combination, with a fuel induction system including a multi-barreled carburetor feeding a common induction system and in which the throttle valve for one barrel is manually controlled and the throttle valve for the other barrel is automatically controlled in accordance with engine operating conditions, of means for preventing operation of the second mentioned throttle valve when the carburetion system is subjected to a choking effect as for starting purpose; and the provision of mean in a construction as above described for manually locking the second mentioned throttle valve in closed position.

The above being among the objects of the present invention the same consists of certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Figure 1 is a fragmentary, side elevational view of an internal combustion engine provided with a fuel induction system in accordance with the present invention;

Fig. 2 is an enlarged, partially broken, partially sectioned side elevational view of the carburetor shown on the engine in Fig. 1 and taken looking in the direction of the arrows 2—2 thereof;

Fig. 3 is a top plan view of the carburetor shown in Fig. 2 with a portion of the control mechanism therefor shown in partially broken, partially sectioned view;

Fig. 4 is a fragmentary, horizontal, partially broken sectional view taken mainly on the line 4—4 of Fig. 2;

Fig. 5 (Sheet 1) is a vertical sectional view taken on the line 5—5 of Fig. 2 and illustrating the locking means provided for locking the auxiliary throttle valve in closed position;

Fig. 6 (Sheet 2) is a fragmentary, horizontal sectional view taken on the line 6—6 of Fig. 2 and illustrating the auxiliary throttle locking means in unlocked position;

Fig. 7 is a view similar to Fig. 6 but showing the auxiliary throttle valve locking means in locked position;

Fig. 8 is a fragmentary, side elevational view of the carburetor shown in Fig. 2 as on the line 8—8 thereof and illustrating the means for manually locking the auxiliary throttle valve against operation under carburetor choking conditions.

It is well recognized by those skilled in the art that one of the greatest problems in connection with internal combustion engines is the provision of a fuel feed system by means of which suitable economy and performance of the engine may be obtained at low engine speeds without restricting maximum power output of the engine. The problem is particularly acute in connection with automobile engines inasmuch as such engines are required to give satisfactory performance over an extremely wide range of engine speeds. Inasmuch as the problems arising in connection with automobile engines are more acute than in any other service the discussion herein will hereafter be limited to the use of internal combustion engines in automobiles, the similarity of the problems in connection therewith and the means for overcoming them being applicable to other uses, those skilled in the art will readily recognize the similarity of both the problem and the cure.

In order to obtain satisfactory low speed operation of an internal combustion engine of the Otto cycle it is necessary that the mixing of the fuel with air to form the combustible mixture must occur at a relatively high speed of the air in order to obtain the intimate mixture of fuel and air necessary to form a homogenous mixture for feeding to the various cylinders of a multi-cylinder engine. However, where a carburetor and/or a fuel induction manifold is made of such small proportions as to provide the desired high rate of air flow at lower engine speeds to obtain and maintain the desired intimacy of mixture, the maximum power output of the engine is materially restricted due to the fact that such small carburetor and fuel induction passages offer too great a restriction to the large volume of combustible mixture required for higher engine speeds to permit a maximum power output of the engine to be obtained. In other words the volumetric efficiency of the engine at higher engine speeds in such case is decreased to such an extent by the back pressure caused by the small fuel induction passages that it is impossible to realize the otherwise maximum power output of the engine. On the other hand if the carburetor and fuel induction passages are increased in size to such an extent as to permit the maximum power to be derived from the engine at higher engine speeds, then the rate of flow of the combustible mixture through the carburetor at low engine speeds will ordinarily be reduced to such an extent that imperfect vaporization of the fuel results, resulting in unsatisfactory engine performance, low economy and many incident problems such as puddling of fuel in the induction passages, loading of the engine, and many other problems too numerous to mention.

The result has been in the past that the designers of internal combustion engines have attempted to provide a fuel induction system that is a happy medium between that most satisfactory for low or normal engine speeds and that most satisfactory for high or maximum power output engine speeds, with the result that the performance and economy of the engine at low engine speed is not entirely satisfactory, nor is it possible to obtain all of the power that the engine would otherwise be capable of developing. It has been suggested in the past to provide a carburetor having two or more barrels or venturis each feeding a common induction system and each barrel or venturi having its own throttle valve and the throttle valve so arranged as to permit one of them to open in advance of the other. As far as we are aware such previously suggested constructions included throttle valves mechanically interconnected with one another so that both were controlled by movement of the accelerator pedal and such that the initial movement of the accelerator pedal would first open one of the throttle valves and continued movement thereof towards fully opened position would gradually open the remaining throttle valve. Such constructions have actually been used in the automobile art and have been more or less satisfactory when operated by one having full knowledge and appreciation of the fuel induction system. However, very few of the driving public are so skilled as to appreciate the short-comings of such a system with the result that the ordinary driver in attempting to cause the automobile having such a system to pick up in speed from low engine speed invariably thrusts the accelerator pedal down to its fullest extent with the result that both throttle valves are opened fully and the speed of combustible mixture flowing through the carburetor and the induction passages decreases to such extent that insufficient fuel is caused to mix with the air to provide for proper combustion in the combustion chambers, liquid fuel drops out of suspension from the combustible mixture, and the engine back fires, or stops, or other detrimental effects of engine operation occur. For these reasons these forms of carburetors have substantially disappeared from the market.

In accordance with the present invention a multi-barreled or multi-Venturi-carburetor is provided, each barrel or venturi of which is provided with a co-operating throttle valve, but instead of manually controlling all of the throttle valves one of the throttle valves only is manually controlled and the remaining throttle valve or valves are automatically controlled in accordance with the demands of the engine itself for a greater supply of combustible mixture. The demands of the engine for greater supply of combustible mixture is always evident by the relative reduction in pressure in the induction system on the upstream side of the throttle valve and, accordingly, in accordance with the present invention advantage is taken of this fact by employing such reduction in pressure to operate a movable wall suitably interconnected to the remaining throttle valve to control the operative position thereof. Where more than two throttle valves are thus employed a separate movable wall operated by such reductions in pressure may be operated to control each automatically operated throttle valve and the automatically operated throttle valves may be adjusted to open one after the other automatically as the reduction in pressure on the upstream side of the throttle valve increases during engine operation. Ordinarily it will be found that two throttle valves are all that will be required for satisfactory performance in an average automobile, the one throttle valve being manually operated and the other automatically operated, and the combined areas of the co-operating venturis being materially greater than the Venturi area of conventional carburetors whereby higher volumetric efficiency at higher engine speeds is possible. Accordingly, a fuel induction system including a carburetor having two throttle valves only is disclosed in the drawings and will be discussed hereafter as illustrative of the general principles of the invention, and the use of additional throttle valves automatically operated in sequence by continued reduction in pressure in the fuel induction system will be readily apparent to those skilled in the art.

Referring now to the accompanying drawings and particularly to Fig. 1 an internal combustion engine is indicated generally at 20 and as comprising a conventional cylinder block 22, cylinder head 24, and intake manifold 26 adapted to distribute a combustible mixture fed thereto from a single source in properly proportioned quantities to the various cylinders (not shown) of the engine in accordance with conventional practice. While the present invention is applicable to both supercharged and unsupercharged engines, as a matter of illustration the engine 20 is shown as being provided with a supercharger indicated generally at 28 provided with a discharge connection 30 connected centrally to the intake manifold 26. A carburetor indicated generally at 32 is shown mounted upon the supercharger 28 in a position to feed its combustible mixture thereto. The invention is particularly adaptable to supercharged engines of the type shown as a more even distribution of the fuel charge is obtained than in engines not supercharged.

Referring now particularly to Figs. 2, 3 and 4 the carburetor 32 will be seen to comprise a housing 40 the lower portion of which is formed to provide a pair of parallel bores 42 and 44 each of which is provided adjacent its upper end with a venturi forming member 46 and 48, respectively. The bores 42 and 44 may be of substantially the same size as indicated in which case it is preferable that the Venturi forming member 46 has a throat of smaller area than the throat of the venturi 48 and preferably from 30% to 50% smaller. On the other hand, it will be recognized that the bores 42 and 44 themselves may be made of different sizes in which case the same general effect may be obtained. In any event it is to be understood that the effective area of the venturi 46 is materially smaller than the effective area of the venturi employed in a conventional single Venturi type of carburetor for an equivalent size of engine.

In view of the fact that in the particular construction shown the carburetor is of the downdraft type in which the air introduced for mixture with the fuel flows downwardly through the carburetor, the bores 42 and 44 are equipped with throttle valves 50 and 52, respectively, below the venturis 46 and 48, respectively. The throttle valve 50 is mounted upon a shaft 54 projecting through opposite walls of the bore 42 to one side of the diametrical center line thereof, as best brought out in Fig. 8, and its left hand end as viewed in Fig. 2 exteriorly of the casing 40 is provided with a lever 56 fixed thereto, which lever is connected by a rod 58 or other suitable means to a conventional accelerator pedal or other suitable means within the control of the driver of the automobile of which the carburetor is considered to form a part. The valve 52 is mounted upon a smaller but co-axial shaft 60, the left hand end of which as viewed in Fig. 2 has a bearing centrally in the right hand end of the shaft 54 and its opposite end projects outwardly through the corresponding wall of the casing 40. Suitable fuel supply nozzles 62 and 64 for the corresponding venturis 46 and 48 are arranged in a conventional manner and connected to a suitable source of liquid fuel in a conventional manner (not shown), for the purpose of supplying the necessary amount of liquid fuel to the air flowing through the venturis.

The throttle valve 50 being manually controlled through the rod 58 from an accelerator or other suitable operating member is the throttle valve through which control of the engine speed is effected in accordance with the present invention, and means which will now be described are provided for automatically maintaining the throttle valve 52 closed during normal or low speed engine operation and to open it under those higher engine speeds where a greater than normal amount of power is required of the engine. To effect this result a pressure operated movable wall is provided and while, in the broader aspects of the invention such wall may be a piston, diaphragm, or the like, as a matter of illustration a casing 62 is suitably mounted at one side of the carburetor 32 as by means of a bracket 64. The casing 62 comprises a pair of pan-like members positioned in face to face relationship with a flexible diaphragm 66 positioned between their open faces and such members are secured together and the diaphragm sealed to each other between them as by rolling the marginal edge of one over the other. A rod 68 projects through one side of the casing 62 and has its inner end fixed and sealed to the central portion of the diaphragm 66. The opposite end of the rod 68 is pivotally connected to the free end of an arm or lever 70 fixedly secured to the outer end of the shaft 60. A coiled spring 72 surrounding the shaft 68 is maintained under compression between an end wall of the housing 62 or corresponding portion of the bracket 64 and an adjustable abutment 74 axially movably arranged on the rod 68. Consequently the spring 72 constantly urges the rod 68 to the right as viewed in Fig. 3 and tends to move the throttle valve 52 to closed position.

The opposite side of the housing 62 from the rod 68 is sealed to one end of a tube 76 the opposite end of which is, in accordance with the broader aspects of the invention, connected into the fuel induction system of the engine anywhere on the upstream side of the throttle valves and between the throttle valves and some other restriction in the fuel induction system so as to be communicated with some point in the fuel induction system on the upstream side of the throttle valve where a variation in pressure occurs during engine operation. Such restriction may be the throat of a venturi, an air cleaner for the carburetor, or any other suitable device or formation. As a matter of illustration such opposite end of the tube 76, as best illustrated in Fig. 4, is connected into the housing 40 with its inner end in open communication with the interior of the venturi 46 through an opening 78 therein located in a position such as is indicated in Fig. 2, in other words at a point downstream from the restricted throat portion of the venturi 46 and at a point between the restriction of the throat of the venturi 46 and the throttle valve 50.

The result of the above described construction is such that as the throttle valve 50 is opened and the speed of the engine 20 increases a drop in pressure occurs between the restricted throat portion of the venturi 46 and the throttle valve 50 and this reduction in pressure is transmitted to the lefthand face of the diaphragm 66 as viewed in Fig. 3 whereupon atmospheric pressure acting upon the righthand face of the diaphragm 66 tends to move the diaphragm 66 and consequently the rod 68 to the left. The rate and initial tension of the spring 72 is preferably such that when the reduction in pressure from atmospheric pressure in the bore 42 at a point where the tube 76 connects therewith becomes such as to exert a material and/or predetermined back pressure to the flow of combustible mixture to the various combustion chambers of the engine, the diaphragm 66 will be caused to move to the left as viewed in Fig. 3 against the force of the spring 72 and, acting through the rod 68 and lever 70, begin to open the throttle valve 52 thus to permit a greater flow of combustible mixture to pass into the induction system of the engine and to thus permit the engine to deliver a greater power output. As the throttle valve 52 is thus caused to open and to permit a greater flow of combustible mixture to the engine the speed of the engine will, of course, correspondingly increase if the throttle valve 50 is maintained in fully opened position, and as the engine thus increases in speed the reduction in pressure in the venturi 46 at the end of the tube 76 will continue to increase, thus increasing the differential of pressures acting upon the diaphragm 66 and causing the valve 52 to continue its movement towards fully opened position until such time as both the throttle valves 50 and 52 are in fully opened position at which time the maximum power output of the engine for the particular speed at which it is then turning will, of course, be realized. The particular differential of pressures at which the throttle valve 52 will begin to open, and the rate of opening of the valve under such pressures may, of course, be varied to suit the particular conditions met with by employing springs 72 of different sizes and by adjusting the initial tension of the spring through adjustment of the abutment 74 on the rod 68.

Thus with the above described construction when properly built and adjusted the only flow of combustible mixture to the engine at low and moderate speeds will be that flow through the venturi 46 past the throttle valve 50 and, providing the venturi 46 is of small enough capacity, the rate of flow of air through it will be sufficient to break up the flow of liquid fuel from the nozzle 62 into such finely atomized form as to maintain it in fully suspended condition until it is delivered into the combustion chambers of the engine for ignition therein.

As previously stated the relative sizes of the venturis 46 and 48 may be varied according to the desires of the individual designer, but we have found that ordinarily it will be desirable that the venturi 46 when the present invention is employed in connection with motor vehicles of modern design, be of such a size as to permit an automobile of which it forms a part to be driven up to a speed of, for instance 60 to 65 miles per hour on a level road and without any undue attempt at quick acceleration, before the throttle valve 52 will be acted upon to initiate its movement towards open position. Accordingly, by the means thus provided the rate of flow of fuel mixture through the carburetor is maintained at a sufficiently high speed over the lower ranges of engine operation to provide the desired satisfactory low speed performance and economy of operation and this without restricting the high speed operation of the engine in any respect.

It may be observed in passing that with a construction thus far described, when the automobile of which the engine forms a part is travelling at low speed, should the throttle valve 50 be suddenly opened to its widest extent as by stepping on the accelerator, (a condition which might cause the engine to stall in the heretofore suggested construction previously described in which both throttle valves were mechanically interconnected) the throttle valve 52 will remain closed for the reason that at such speeds the engine will be turning over at such a slow rate of rotation that its demand for a supply of combustible mixture will not be sufficiently great to produce that amount of pressure reduction between the throat of the venturi 46 and the throttle valve 50 to cause the throttle valve 52 to open. Accordingly, the present construction automatically provides against the supplying of an improperly carbureted fuel mixture through inadvisable operation of the accelerator pedal.

It is, of course, essential in order to obtain the desired speed of reaction in the engine upon release of pressure on the accelerator pedal, that the valve 52 be returned instantly to closed position the moment that the valve 50 is returned to closed position. This is accomplished in the present case not only by reason of the fact that as soon as the throttle valve 50 is closed the drop in pressure between atmosphere and the space below the throat of the venturi 46 will be substantially immediately equalized and thus permit the spring 72 to urge the valve 52 towards closed position, but further by reason of the fact that the valve 52 is off-center and with the bulk of its area on that side of the shaft 60 which when subjected to a drop in pressure on its lower face will tend to force it towards closed position and maintain it tightly in such position. This has the effect of making the throttle valve 52 instantaneously responsive to the closing movements of the valve 50 and eliminates the possible occurrence of a lag in operation of the valve 52 toward closed position under such circumstances. It also insures closing of the valve 52 in event of breakage or loosening of any part of the connection between the valve 52 and diaphragm 66.

As in substantially all carburetors the present carburetor is provided with a choke valve 80 to enable a relatively rich mixture to be obtained for starting conditions. The choke valve 80 by way of illustration is shown mounted in an extension housing 82 mounted upon the upper face of the housing 40 and is centrally secured to a shaft 84 projecting diametrically through the housing 82 and provided with an arm or lever 86 at its outer end which may be connected as by means of a wire or cable 88 with a conventional choke button or other suitable manual or automatic operating member. It will, of course, be apparent that when the choke valve 80 is closed so as to restrict the flow of air into the carburetor and under which conditions it is usually desirable to allow the carburetor throttle valve or valves to remain in closed or partially closed condition, the reduction in pressure within the carburetor caused by turning the engine over with the choke valve in closed position might effect a sufficient reduction in pressure within the carburetor to cause the throttle valve 52 to be opened unless otherwise guarded against. Additionally, if the engine is started and the choke valve 80 is maintained in closed or partially closed condition the valve 52, unless otherwise guarded against, might be caused to open to its fullest condition and thereby cause the engine to race or otherwise speed up to an undesirable extent. To obviate the occurrence of any such condition a rod 90 is pivotally connected at one end to the arm of lever 86 on the shaft 84 of the choke valve 80. The lower end of such rod 90 is loosely guided in an extension 92 projecting laterally outwardly from the housing 40 and the lower free end of the rod 90 terminates in the plane of movement of the arm of lever 70 on the shaft 60 for the throttle valve 52. As best illustrated in Fig. 8 the arm 70 is provided with a laterally extended upwardly projecting finger or lug 94 in such position that its path of movement is intersected by the lower end of the rod 90 when the choke valve 80 is moved into closed position, as indicated in dotted lines in Fig. 8. Consequently, when it is desired to start the engine, and the choke valve 80 is closed through manipulation of the cord or wire 88 the resulting movement of the lever or arm 86 will cause the lower end of the rod 90 to be moved into a position to block opening movement of the arm or lever 70 and consequently the throttle valve 52. By this means an automatically responsive device is provided by means of which it is impossible for the auxiliary throttle valve 52 to open as long as the choke valve 80 is in closed or partially closed condition. This effectively obviates any disadvantageous results which otherwise might occur for the reasons described.

It may often be found desirable to effectively lock the auxiliary throttle valve 52 in closed position so that it will remain closed regardless of the operating condition of the engine. Such occasions may arise, for instance, when a new automobile is driven from the factory to its intended point of sale and so that the driver may not be able to drive the automobile at a speed which might endanger damage to parts of the engine through excessive speed while in a new condition. Other such conditions might arise where the owner of a car loans the same to a young or inexperienced driver and as a safe-guard that the car will not be driven at excessive speeds while in his care. In accordance with a further phase of the present invention such means is provided as follows. The housing 40 at the point where the shaft 60 for the throttle valve 52 projects therethrough is provided with an enlargement 100 and this enlargement 100 is provided with a pair of concentric bores 102 and 104 as clearly brought out in Figs. 5, 6 and 7. The enlarged bore 102 opens on to the outer face of the enlargement 100 and receives therein a lock cylinder 106 preferably of the key operated multi-tumbler type. The lock cylinder 106 is provided with an operating stem 108 received in the smaller bore 104. The smaller bore 104 extends into partially intersecting relation with respect to the bore in the housing 40 in which the shaft 60 is received and the operating end 108 of the lock cylinder 106 is notched out as at 110, as best brought out in Fig. 5, so that when the end 108 is turned to one position of operation it completely clears the circumference of the shaft 60 and thus permits its free rotation therein. As also best brought out in Fig. 5 the shaft 60 at the point of intersection thereof with the bore 104 is notched out as at 112 an amount sufficient to permit the end 108 to be rotated therein when the valve 52 is in closed position. As will be readily understood, when the end 108 is rotated into the notch 112 so that its outer surface lies substantially in flat contacting relationship with respect to the bottom of the notch 112, rotation of the shaft is effectively prevented. The construction thus provides a key controlled lock for locking the auxiliary valve 52 in closed position and thus preventing unauthorized speeding of the engine 20 and of the automobile of which it forms a part.

Formal changes may be made in the specific embodiment of the invention described without departing from the spirit or substance of the broad invention, the scope of which is commensurate with the appended claims.

What is claimed is:

1. In combination with an internal combustion engine having an intake manifold, a pair of separate mixing chambers for supplying a combustible mixture to said manifold, a manually operable throttle valve for controlling the flow of mixture through one of said mixing chambers, a throttle valve for controlling the flow of combustible mixture through the other of said mixing chambers, means normally operative by pressure variations on the upstream side of the first mentioned throttle valve for controlling the operative position of the second mentioned throttle valve, choking means for said mixing chambers, and means operatively interconnected with said choking means for positively locking said second mentioned throttle valve in closed position when said choking means is operated to effect a choking of said mixing chambers.

2. In combination with an internal combustion engine having an intake manifold, a pair of mixing chambers for feeding combustible mixture to said manifold, a throttle valve in each of said mixing chambers for controlling the flow of combustible mixture therethrough, manually controllable means for controlling one of said throttle valves, fluid pressure operated means for controlling the operation of the second mentioned throttle valve, a choke valve on the upstream side of said throttle valves, and means operated by closing movement of said choke valve for positively locking the second mentioned throttle valve against opening movement.

3. In an internal combustion engine having a fuel induction system common to a plurality of the cylinders thereof, said fuel induction system including, in combination, a pair of fuel mixing chambers having independent discharge openings, a manually controlled throttle valve in the discharge opening of one of said mixing chambers, an independently operable throttle valve in the discharge opening of the second mixing chamber, a fluid pressure operated device operatively connected with said second throttle valve, a Venturi tube in said first mentioned mixing chamber anterior of said manually controlled throttle, a fluid passage from said fluid pressure operated device opening into said Venturi tube on the downstream side of the throat thereof, whereby said second throttle valve is opened on predetermined mixture velocity in said first mentioned manually controlled fuel mixing chamber, and independent fuel nozzles for discharging fuel in said mixing chambers, respectively.

FLOYD F. KISHLINE.
HARRY G. SANGER.